Oct. 14, 1941. W. R. NEW 2,258,795
ELASTIC-FLUID TURBINE
Original Filed Feb. 21, 1941   2 Sheets—Sheet 1

INVENTOR
WINSTON R. NEW.
BY
ATTORNEY

Oct. 14, 1941.                W. R. NEW                 2,258,795
                        ELASTIC-FLUID TURBINE
            Original Filed Feb. 21, 1941      2 Sheets-Sheet 2

INVENTOR
WINSTON R. NEW.
BY
ATTORNEY

Patented Oct. 14, 1941

2,258,795

UNITED STATES PATENT OFFICE 2,258,795

ELASTIC-FLUID TURBINE

Winston R. New, Springfield, Pa., assignor to Westinghouse Electric & Manufacturing Company, East Pittsburgh, Pa., a corporation of Pennsylvania Continuation of application Serial No. 380,029, February 21, 1941. This application June 14, 1941, Serial No. 398,004

7 Claims. (Cl. 253—69)

The present application is a continuation of application Serial No. 380,029, filed February 21, 1941, showing an alternative form of foil blades usable in sub-acoustic velocity stages, as disclosed and claimed in my application Serial No. 324,743, filed March 19, 1940.

The invention relates to turbine blades of foil section for employment in sub-acoustic velocity stages and it has for an object to provide apparatus of this character capable of improved performance at stage velocity ratios lower than disclosed in said application Serial No. 324,743.

In said application Serial No. 324,743, there are disclosed and claimed both multiple and single velocity abstraction stages having blading of foil section. The present invention represents an improvement thereover in respect to moving blade features. In general, the improved foil section is of larger camber and has a smaller inlet edge radius, and it is an object of the present invention to provide turbine stages having the improved blading.

A further object of the invention is to provide foil section blading disposed at a ratio of pitch to chordal dimension equal to or less than ⅔ and greater than ⅓ and wherein each blade has a camber equal to or greater than ¼ of the chordal dimension.

A further object of the invention is to provide a foil section blade whose inlet edge radius varies as the foil thickness and inversely as the camber, that is, the inlet edge radius has a maximum equal to or less than ⅐ of the chordal dimension and a minimum equal to or greater than ¼ of said maximum.

The foregoing and other objects are effected by the invention as will be apparent from the following description and claims taken in accordance with the accompanying drawings, forming a part of this application, in which:

As more fully set forth in application Serial No. 324,743, elastic-fluid velocities should be considered in selecting turbine blading. Where the velocity is superacoustic, usually encountered only in the first moving row of the initial impulse stage, the blades should have sharp inlet edges, and where the velocity is sub-acoustic, as is usually the case for the remainder of the blading of the turbine, the blades should be of foil section having well-rounded inlet edges. Accordingly, there are illustrated, described and claimed, multiple-velocity abstraction (Curtis) and single-velocity abstraction (Rateau) stages having moving blades of foil section with rounded inlet edges. In said application, there is shown blading generally like that disclosed and claimed in the reissue patent to Lysholm 18,485, reissued May 31, 1932, so far as the foil section is concerned. In accordance with the present invention, the blading has a greater camber, the radius of rounding of the leading edges is less, the camber is preassigned in amount and location on the basis of velocity ratio, the camber is in inverse relation with respect to the velocity ratio and the blades are so disposed that the pitch to chordal dimension ratio is equal to or less than ⅔ and greater than ⅓. While $h$ of said reissue patent is a groove dimension and for that reason is not a satisfactory measure of the size of the foil, nevertheless, if the blading of the present invention is regarded from the point of view $h$, or blade width, in no case is the use of the improved foils contemplated where the relation of pitch to width, $$\frac{p}{h}$$

equal to $$\frac{k}{\sqrt{\sin \alpha}}$$

involves a value of $k$ equal to or greater than 0.5. The foregoing differentiating features give to the blading improved performance at lower velocity ratios, making it particularly useful in impulse stages where good acceleration and starting characteristics are desired, as with locomotive and marine propulsion.

Figure 1:
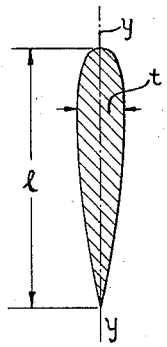
Figs. 1 and 2 are sectional views illustrative of principles involved in the improved blading.
Figure 2:
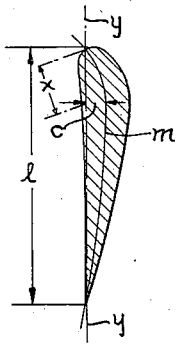

In order that the invention may be more readily understood, certain fundamental considerations will first be briefly explained. Aeronauticists use a simple and effective means of designating foils by a system of numbers beginning with the basic streamlined shapes of several proportions of $t/l$, referring to Fig. 1, where $t$ is the foil thickness and $l$ is the chordal length or dimension. Bending of the foil may be conceived of as occurring in an infinite number of ways, for example, as in Fig. 2, the mean line $m$ departs from $y$-$y$ by various amounts along its length. The maximum departure is known as camber expressed as a percentage of the foil breadth or chordal dimension. The location of the camber from the leading edge is likewise expressed as a percentage of the chordal dimension, that is, in Fig. 2, the amount of camber is $c/l$ and its location is $x/l$ from the leading edge.

The foil requirements for a sub-acoustic velocity turbine stage differ from those of an airplane wing largely in that the desired turning angle of the fluid is almost invariably larger. This leads to foils of greater camber.

For convenience, the chordal dimension of a turbine blade is defined as the maximum dimension from the leading edge to the trailing edge parallel to a flat surface on which the blade lies, concave face downward. This dimension can be easily measured. The amount and location of camber can be given with respect to the flat surface. In accordance with the present invention, the aeronauticist's system of designating and measuring foils has been slightly modified. The aeronauticist starts with the mean line and constructs the foil suitably thereto, for example, in Fig. 2, he would start with the mean line in the position shown, and selecting the amount and location of camber, together with the slenderness ratio, he would construct the foil.

Figures 7, 8:
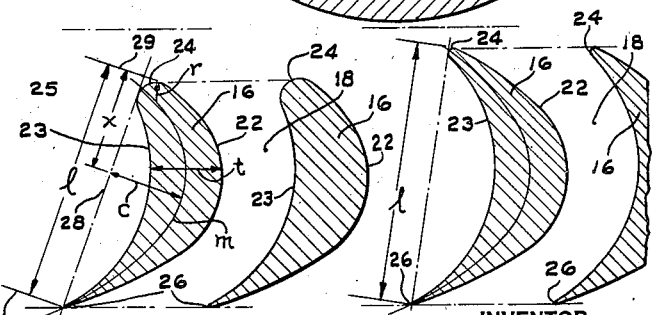
Fig. 7 is a sectional view showing an improved foil section made in accordance with the present invention.
Fig. 8 is a sectional view showing a modified form of foil section and falling within the scope of the invention.

Practical considerations dictate slight modifications of the foregoing system for the turbine designer. If his starting point is not a mean line, but a foil, then, the chordal dimension $l$, may be regarded as the distance measured parallel to a surface on which the blade lies, concave face downward, and included between a normal to the surface tangent to the inlet edge and the normal tangent to the trailing edge. In Figs. 7 and 8, the camber $c$ is the maximum departure of the mean line $m$ of the foil from the surface, indicated by the dot-and-dash line 28 on which it lies with the concave face being directed toward the surface. In other words, in accordance with the present system, the foil may be regarded as placed on a flat surface, concave face downward, and the distance between the normals to such surface and contacting with the inlet and trailing edges is regarded as the chordal dimension $l$ and the maximum departure of the mean line $m$ from the surface on which it lies, concave face downward, is regarded as the camber $c$. The present system involves some modification in the choice of surface from which the camber is measured, but it does not alter the usefulness of the aeronauticist's system of describing foils from the points of view of operation and performance.

Figure 3:
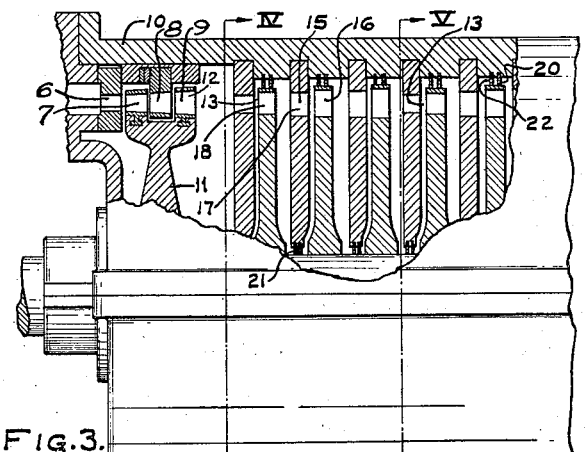
Fig. 3 is a fragmentary sectional view showing a plurality of stages employing the improved blading.
Figure 4:
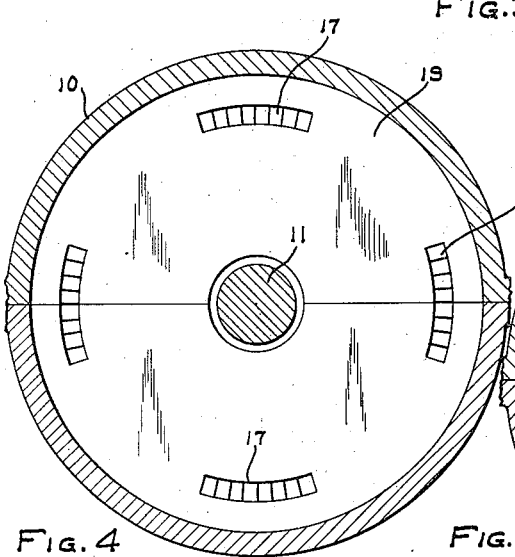
Figs. 4 and 5 are sectional views taken along the lines IV—IV and V—V of Fig. 3.
Figure 5:
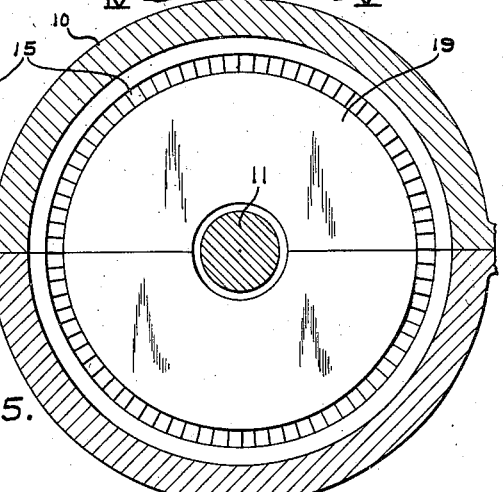
Figure 6:
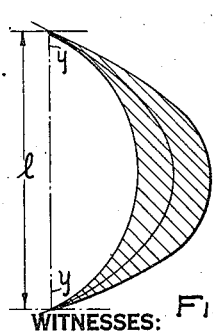
Fig. 6 is a sectional view showing a symmetrical or crescent shape impulse type blade.
Figure 9:
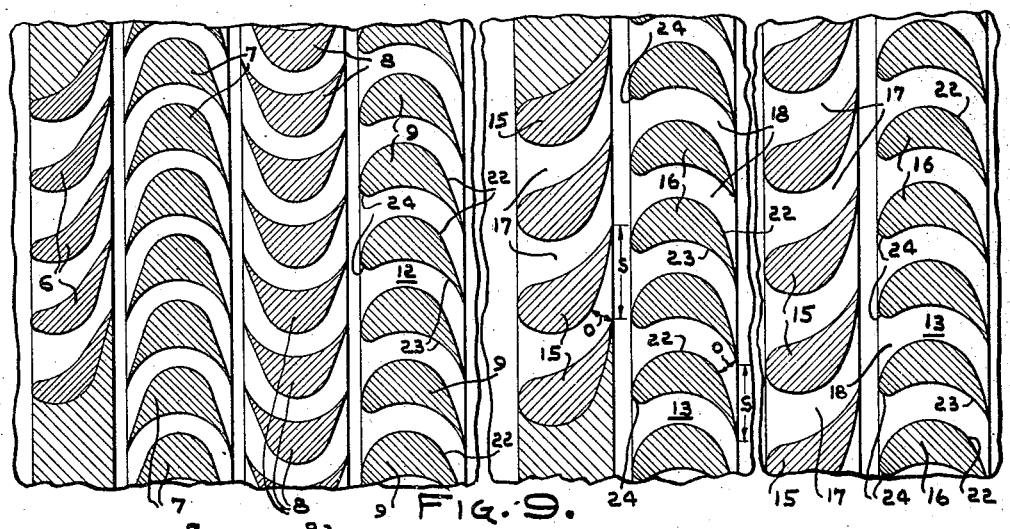
Fig. 9 is a longitudinal sectional view of stages of the turbine shown in Fig. 3.

Referring to Figs. 3 and 9, the multiple-velocity impulse stage 12 includes nozzles 6, a first row of moving blades 7 and a row of reversing blades 8 separating the latter from the second row of moving blades 9. Each of the single-velocity impulse stages 13 includes a plurality of stationary blades or vanes 15 followed by a row of moving blades or vanes 16, the stationary blades defining nozzle passages 17 for delivering elastic fluid to the blade passages 18.

Figure 10:
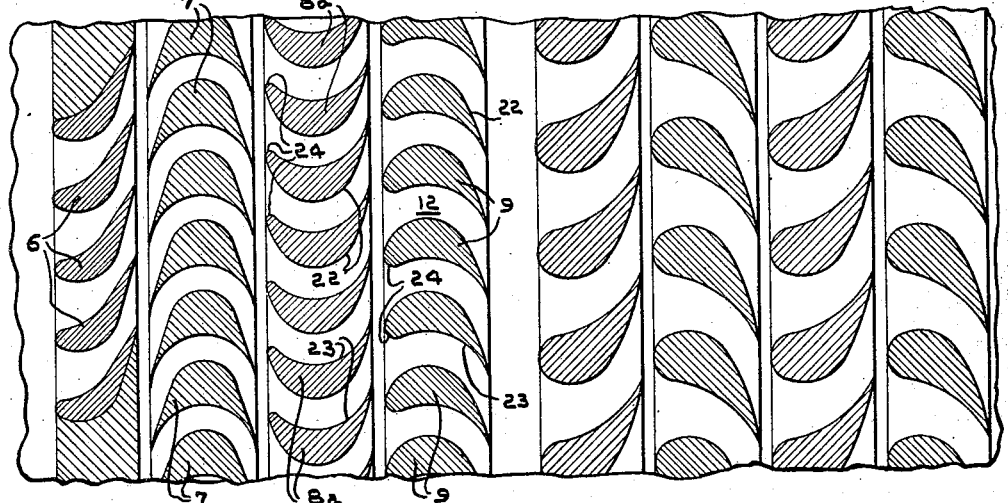
Fig. 10 is a view similar to Fig. 9 but showing modification of the stages of the latter; and, Fig. 11 is an efficiency and velocity ratio diagram.

In Fig. 10, the multiple-velocity abstraction impulse stage is the same as that already described except that instead of sharp edge reversing blades 8, reversing blades 8a of foil section are used. Also, instead of single velocity abstraction stages having the improved blading, the blading may be arranged as disclosed in said application Serial No. 324,743 to define stages wherein equal enthalpy changes occur over the stationary and moving blade rows.

In Fig. 7, each blade 16 is of foil section defined by convex and concave faces 22 and 23 joined by the curved inlet edge 24. The chordal dimension is the distance $l$ measured parallel to the dot-and-dash straight line 28 contacting with the concave side of the section at inlet and trailing edge regions thereof and included between the normal 29 tangent to the inlet edge 24 and the normal 30 tangent to the trailing edge 26. The camber $c$ is the maximum departure of the mean line $m$ of the foil from said straight line 28. These geometrical quantities, $l$ and $c$, as well as the distance $x$ of camber $c$ from the inlet edge, the thickness $t$, and the radius $r$ of the inlet edge, ascribable to the section, are used to determine the dimensionless ratios $c/l$, $x/l$, $t/l$ and $r/l$. In other words, the foil is defined by the amount and location of camber, thickness, and radius of the inlet edge expressed as percentages of chordal dimension, and adjacent blades are so disposed that the pitch bears a certain ratio range with respect to the chordal dimension. The camber $c$ has an amount greater than $\frac{1}{4}$ of the chordal dimension $l$. The inlet edge radius has a maximum $\frac{1}{7}$ of the chordal dimension $l$ and a minimum which is not less than $\frac{1}{4}$ of such maximum, also, such a radius varies approximately as the maximum thickness of the foil and inversely as the camber. The ratio of pitch to chordal dimension of adjacent blades is not greater than $\frac{2}{3}$ and not less than $\frac{1}{3}$.

In Fig. 8, the foil has a larger camber and a smaller radius of curvature of the inlet edge than is the case with the foil of Fig. 7.

With a choice of camber to suit a given velocity ratio, it will be apparent how this foil-type blading may be made peculiarly suitable for handling elastic fluid at velocities high in relation to blade speed, the rounding of the inlet edges accommodating for wider variation in the angle of approach of the steam or elastic fluid while maintaining good performance.

Figure 11:
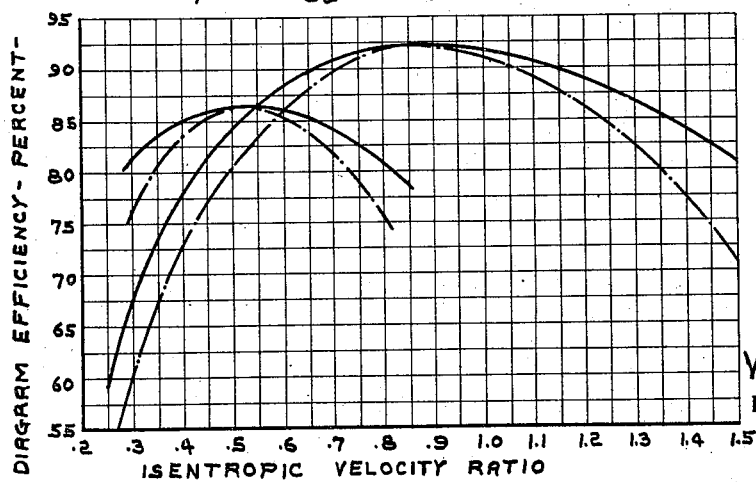

Diagrammatic Fig. 11 shows the performance relation of the blading of application Serial No. 324,743 with the improved blading. In the prior arrangement, optimum performance is secured at a velocity ratio of around 0.9, and, with the improved blading, such performance occurs at a velocity ratio of about 0.5. The effect of providing for broadened efficiency at a lower velocity ratio gives improved performance under starting and accelerating conditions, thereby making the improved blading particularly useful in impulse stages of locomotive and marine propulsion turbines.

From the foregoing, it will be seen that said application Serial No. 324,743 introduced into impulse stages moving blading of foil section and having rounded inlet edges, this type of blading being particularly useful with sub-acoustic velocities in that it permits the elastic fluid to accommodate itself to the blading over a wide range of variation in the angle of approach.

The present invention, while preserving the rounded inlet edge for the purpose indicated, introduces the other features described so that optimum efficiency is secured at a relatively lower velocity ratio. The improvement is applicable to impulse stages either of the multiple or single velocity abstraction types, the single-velocity abstraction type being defined as one wherein the heat drop or enthalpy change occurring over the stationary blade row is greater than that taking place over the moving row of a stage, this being provided by more constriction or less gauging of the ratio of opening $o$ to pitch $s$ of the stationary row as compared to the moving row.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In an elastic fluid turbine, a multiple velocity abstraction stage followed by a plurality of other stages; said multiple-velocity abstraction stage including first and second rows of moving blades separated by a row of reversing blades; said first row of moving blades having sharp inlet edges and the second row of moving blades being of foil section having inlet edges sufficiently well-rounded to cause the streamlines of elastic fluid approaching at sub-acoustic velocity to accommodate themselves to the blades over a wide range of variation in the angle of approach of elastic fluid; said second row of moving blades being disposed in a pitch to chordal dimension ratio equal to or less than $2/3$ and greater than $1/3$ and the foil section of each such blade having a camber dependent upon the stage velocity ratio at which maximum efficiency is sought such that, as such velocity ratio is decreased, the camber is increased and vice versa, and the amount of camber being equal to or greater than $1/4$ of the chordal dimension of the foil section; and said other stages including stationary and moving blades each of foil section and having an inlet edge sufficiently well-rounded to cause streamlines of elastic fluid approaching at sub-acoustic velocity to accommodate themselves to the blade over a wide range of variation in the angle of approach of the elastic fluid.

2. The combination as claimed in claim 1 wherein the inlet edge of each second-row moving blade of the multiple-velocity abstraction stage has a radius whose maximum is equal to or less than $1/7$ of the chordal dimension and whose minimum is equal to or greater than $1/4$ of said maximum.

3. The combination as claimed in claim 1, wherein the blades of each moving row of said other stages are disposed in a pitch to chordal dimension ratio equal to or less than $2/3$ and greater than $1/3$ and wherein the foil section of each such moving blade has a camber dependent upon the stage velocity ratio at which maximum efficiency is sought such that, as such velocity ratio is decreased, the camber is increased and vice versa, and the amount of camber being equal to or greater than $1/4$ of the chordal dimension of the foil section.

4. The combination as claimed in claim 1, wherein the blades of each moving row of said other stages are disposed in a pitch to chordal dimension ratio equal to or less than $2/3$ and greater than $1/3$ and the foil section of each of such blades has a camber dependent upon the stage velocity ratio at which maximum efficiency is sought such that, as such velocity ratio is decreased, the camber is increased, and vice versa, and the amount of camber being equal to or greater than $1/4$ of the chordal dimension of the foil section; and wherein the inlet edge of each blade of the second moving row of the multiple-velocity abstraction stage and the moving row of each of said other stages has a radius which varies approximately as the maximum foil thickness and inversely as the camber.

5. In an elastic-fluid turbine, a stage for abstracting energy from elastic fluid delivered thereto at sub-acoustic velocity, said stage comprising a row of stationary vanes delivering elastic fluid to a row of moving vanes, said stationary and moving vanes each being of streamline foil section and having an inlet edge sufficiently well rounded to cause streamlines of elastic fluid approaching at sub-acoustic velocity to accommodate themselves to the vane over a wide range of variation in the angle of approach of elastic fluid and the ratio of opening to pitch for the stationary vanes being smaller than that for the moving vanes in order to provide for greater enthalpy change in the former than in the latter and said moving blades being disposed in a pitch to chordal dimension ratio equal to or less than $2/3$ and greater than $1/3$ and each moving blade having an amount of camber equal to or greater than $1/4$ of the chordal dimension of its section.

6. The combination as claimed in claim 5, wherein the radius of curvature of the inlet edge of each moving blade has a maximum equal to or less than $1/7$ of the chordal dimension and a minimum equal to or greater than $1/4$ of the maximum.

7. The combination as claimed in claim 5, wherein the camber of each moving blade is in inverse relation to the stage velocity ratio.

WINSTON R. NEW.